3,692,721
THERMOSETTING BONDING AGENTS
Friedrich Josten, Tervoortstr. 16, Rheinkamp-Utfort, Germany; Wilhelm Lucker, Wilhelmstr. 63, Homberg, Lower Rhine, Germany; Hans Albrecht Meyer-Stoll, Kuhlmannstr. 11, Rheinkamp, Germany; and Wolfgang von Minden, Heidestr. 76, Rheinkamp-Repelen, Germany
No Drawing. Filed Apr. 23, 1970, Ser. No. 31,399
Claims priority, application Germany, Apr. 30, 1969, P 19 22 015.6; Mar. 17, 1970, P 20 12 588.6
Int. Cl. C08g 37/18, 37/04
U.S. Cl. 260—29.3                                12 Claims

ABSTRACT OF THE DISCLOSURE

This invention relates to thermosetting bonding agents which are condensation products of phenol, urea, acetone, formaldehyde and alkanediol. Further, it pertains to the manufacture of said agents by reacting phenol, formaldehyde, urea and acetone under alkaline conditions followed by reacting the resultant product mixture with alkanediol under acidic conditions. It also relates to compositions comprising said agents and sand useful as foundry mold and cores.

BACKGROUND OF INVENTION

Conventional binders for use in the well known "hot-box process" for hardening foundry molds and cores contain furfuryl alcohol or its oligocondensation products as essential components, because furfuryl alcohol will enter into a strongly exothermic reaction with itself at a minimum of activation to form resins of excellent mechanical resistance and good bonding properties. Furfuryl alcohol will also react under strongly exothermic conditions with the other reactants present in conventional binders, mostly urea resins or intermediates thereof, to form stable resins. It is this property of entering into exothermic reactions that has made furfuryl alcohol a sine qua non in carrying out the "hot-box process." In this process, outside heat is briefly applied via the hot core box to a core consisting of a sand-binder mixture, thus activating the exothermic reaction of the binder on the surface of the core. The heat evolved by the exothermic reaction must be sufficient to activate the reaction inside the core, thus curing the latter. Another prerequisite to the practicability of the "hot-box process" in as adequate storage life of the sand-binder mixture, which again can be ensured by using a bonding agent based on furfuryl alcohol.

A disadvantage of the conventional binding agents based on furfuryl alcohol is the high price of the latter. This is due to high manufacturing costs and is unlikely to be changed in the foreseeable future. Another disadvantage of the conventional bonding agents based on furfuryl alcohol is that furfuryl alcohol can be made only from specific vegetable raw materials that are by no means available in sufficient quantities at any given time. The vegetable raw materials must have a minimum content of pentosans, and their contents of certain other vegetable substances must keep within definite limits. Since the chemical composition of plants depends on both climate and weather conditions, there is often an acute shortage of raw materials for making furfuryl alcohol.

SUMMARY OF INVENTION

It is an object of the invention to provide bonding agents that are suitable for the "hot-box process" and other foundry purposes and do not contain furfuryl alcohol or its derivatives. Another object of the invention is to provide bonding agents that are suitable for the "hot-box process," satisfy the requirements met by the conventional bonding agents based on furfuryl alcohol, namely, ease of reaction, strongly exothermic conditions during the reaction, and adequate storage life, and still are less expensive than the conventional bonding agents based on furfuryl alcohol. Still another object of the invention is to provide bonding agents that are suitable for the "hot-box process" and can be made from raw materials available in sufficient quantities at any time. A further object of the invention is to enlarge the raw material basis for the manufacture of bonding agents suitabel for the "hot-box process." Still further objects are to provide a process of manufacture of said bonding agents and to foundry compositions resulting therefrom. Other objects of the invention will become evident from the description.

The invention achieves these objects by the cocondensation of phenol, urea, acetone, formaldehyde and alkanediol of from 2 to 4 carbons and the binding agent resulting therefrom. The use of acetone and dihydric low-molecular aliphatic alcohols as co-condensation partners results in co-condensation products whose reactivity equals that of bonding agents based on furfuryl alcohol.

DETAILED DESCRIPTION OF INVENTION

In the process according to the invention, phenol and formaldehyde, normally in an aqueous medium, are first condensed by standard means in an alkaline medium, e.g., at a pH between about 8.0 and 11, e.g., using as the alkaline medium aqueous solutions of sodium hydroxide, calcium hydroxide, barium hydroxide, sodium carbonate or ammonia to adjust the pH to the desired value. More formaldehyde as well as urea and acetone are then added to the condensation product obtained. Maintaining alkaline conditions, the condensation is continued over a first period. At the end of the first period, e.g. between about 0.5 and 2 hours in length, the reaction mixture is acidified, e.g., to a pH between about 1 and 5.5, e.g., using aqueous acidic agents such as formic acid and mineral acid such as sulfuric, hydrochloric and phosphoric. The condensation is continued over a second period, e.g., 0.2–1 hour. At the end of the second period, alkanediol of 2 to 4 carbons is added, and condensation is continued while maintaining said acid conditions, e.g., for a period of 0.2–1 hour. Finally, the reaction mixture is neutralized. Normally solid product bonding agent is not recovered as such if scheduled for foundry use, but rather in combination with at least a portion of the water normally introduced with the ingredients. When this is the case, only sufficient water is removed by distillation to obtain a bonding agent-water composition having the desired viscosity for foundry use, the water functioning as diluent.

The condensations are conducted at an elevated temperature, e.g., between about 50 and 150° C.

In a special embodiment of the invention, the said second period between acidification and addition of alkanediol is kept extremely short, that is, the dihydric aliphatic alcohol is added immediately after the addition of acid. This embodiment of the invention shortens the overall manufacturing process without reducing the strength of the cores made with the bonding agent.

In the process of the invention, the condensation product formed has an ingredient ratio of 0.5 to 1.5 moles of urea, 0.1 to 1.0 mole of acetone, 2 to 7 moles of formaldehyde and 0.1 to 0.8 mole of dihydric low-molecular aliphatic alcohol per mole of phenol, preferably 0.7 to 1.0 mole of urea, 0.2 to 0.5 mole of acetone, 3 to 5 moles of formaldehyde, and 0.2 to 0.5 mole of dihydric low-molecular aliphatic alcohol per mole of phenol. The mole figures given for formaldehyde refer to the total quantity of formaldehyde to be converted. From 20 to 80 wt. percent, preferably from 40 to 60 wt. percent, of the said total quantity of formaldehyde are condensed with the phenol in an alkaline medium to form the phenol-formaldehyde condensate. The rest of the formaldehyde is added later together with urea and acetone. The formaldehyde may be used in the form of aqueous solution and/or as paraformaldehyde. Sodium hydroxide is most suitable for creating the alkaline condition. For neutralization buffers, materials such as tertiary sodium orthophosphate may be used for buffering the alkaline condition. Acidification is preferably carried out with formic acid.

In another embodiment of the invention, the contemplated binding agents are formed by condensing under acid conditions a mixture of the following described "a," "b" and "c."

(a) phenol-formaldehyde condensation products condensed in the alkaline medium,
(b) urea-acetone-formaldehyde condensation products, and
(c) dihydric low-molecular aliphatic alcohol.

The condensation product thus obtained is then neutralized.

The condensation products mentioned under (a) are obtained in the standard manner by heating phenol and aqueous formaldehyde solution (e.g. 30% wt. HCHO) in a phenol: formaldehyde molar ratio varying from 1:1.5 to 1:2 in the presence of alkalis without distilling off any water.

The condensation products mentioned under (b) are obtained by heating urea, acetone, and aqueous formaldehyde solution (e.g. 37% wt. HCHO) e.g., in molar ratios of 1:2 for (urea+acetone):formaldehyde and from 1:0.1 to 1:0.5 for urea:acetone without distilling off any water.

The alcohols mentioned under (c) have, as heretofore stated, from 2 to 4 carbon atoms. Ethylene glycol is preferred.

The weight of ratios of the components mentioned under (a), (b), and (c) used for co-condensation in an acid medium may vary from 1:0.7:0.01 to 1:2:0.08 for a:b:c. A preferred weight ratio is 1:1:0.03.

After neutralization of the final product in the process, normally only a portion of the water present is removed, e.g., by evaporation, in order to provide sufficient water diluent to facilitate introduction of the binder product into sand for the preparation of foundry molds and cores. Preferably, the binder solids content in the partially evaporated final reaction mixture is adjusted by evaporation to about 71 to 75 wt. percent. These partially evaporated bonding agent compositions obtained by the process of the invention are liquids which at normal temperature can be stored for reasonable periods of time without undergoing any substantial change. With a small amount of catalytic or thermal excitation, however, they will enter into a strongly exothermic reaction with themselves to form very solid resins with good bonding properties. When about 2 to 3 parts by weight of such bonding agent compositions are mixed with 100 parts by weight of fine quartz sand and about 0.3 to 1 part by weight of an acid or acidic catalyst, such as ammonium chloride or ammonium nitrate, a plastic molding sand is obtained which depending on the storage temperature can be stored for several hours without suffering any appreciable loss in plasticity. Using well-known techniques, this molding sand may be either rammed or shot into the molding box. The cores and molds thus obtained have sufficient green strength and can be cured in conventional drying ovens. It is not necessary to leave the cores in the oven until they are completely cured. When the heat of the drying oven has penetrated to a certain depth below the core surface, it will excite a reaction of the bonding agents according to the invention which produces sufficient heat to maintain itself and penetrate to the innermost part of the core. In this reaction, the bonding agent is converted to a solid resin which binds the sand grains and thus produces a hard core. The depth to which the heat must penetrate to cause spontaneous curing of the core depends on the geometry of the latter. Following usual practice, the time of heat application and the temperature are tried out for a given core. As a rule, when using bonding agents made by the process of the invention, the intensity of heat application may be reduced in the same measure as the ratio of core surface to core volume decreases.

Especially in the case of large cores and molds used for the manufacture of castings weighing several tons, bonding agents made by the process of the invention may permit considerable heat economies, because the drying ovens need only be used for heating up a surface layer of the respective core or mold. Use of the bonding agents according to the invention permits a particularly advantageous technique of core and mold making. Irrespective of their size, the cores removed from the mold are fanned with a soft flame. This starts the complete curing process, and drying ovens become superfluous. Where the shape of a core is so unfavorable that the core cannot support itself in the green condition, the core may, after removal from the mole, be placed in drying shells. These need no longer be made of metal, because they will not be subjected to a lengthy treatment in a drying oven. Instead, the shells may be made of less expensive and more easily workable materials, such as oxychloride cement or epoxy resins incorporating fillers.

To summarize as to foundry use, well-known "hot-box process" may be carried out using the bonding agents of the invention without having recourse to furfuryl alcohol. The storage life of the mixture consisting of sand, binder and acid or acidic catalyst may be adjusted to a sufficient length of time, depending on the temperatures encountered in foundries, to prevent premature hardening in the hopper of the shooting machine.

The following examples are to illustrate the invention without limiting the scope thereof:

EXAMPLE 1

175 parts by weight of phenol and 250 parts by weight of a 37 wt. percent aqueous formaldehyde solution were heated while stirring until first indications of reflux began to appear and maintained at that temperature, while the pH value was adjusted to 8.5 to 9 by addition of sodium hydroxide. After 30 to 40 minutes, another 350 parts by weight of a 37 wt. percent aqueous formaldehyde solution, 100 parts by weight of urea, 25 parts by weight of acetone, and 35 parts by weight of a 10 wt. percent aq. $Na_3PO_4$ solution were added. For another 15 minutes the reaction mixture was maintained at a temperature just below the reflux temperature. Then the pH-value was adjusted to 5 using a 10 percent aq. formic acid, and after about 5 minutes 15 parts by weight of ethylene glycol were added. The solution was then maintained for 30 minutes at a temperature just below the reflux temperature and using NaOH solution the pH was brought to 7.5. Subseqently, 420 parts by weight of water were drawn off in vacuo at about 40° C. leaving a viscous mixture of residual water and binding agent condensation product of phenol, formaldehyde, urea, acetone and ethylene glycol whose component ratio is essentially that of the weight ratios of the introduced material.

EXAMPLE 2

658 grams of phenol (7 moles) and 1190 grams of a 30 wt. percent aqueous formaldehyde solution (11.9 moles HCHO) were rapidly heated to 90° C. using 16 grams of a 32.5 wt. percent aqueous sodium hydroxide solution, maintained at that temperature for about 1 hour and then cooled. 1864 grams of aqueous, clear condensate (a), were formed.

384 grams of urea (6.4 moles) and 1300 grams of a 37 wt. percent aqueous formaldehyde solution (16 moles HCHO) were heated to 90° C. within one hour using 10 grams of trisodium phosphate. Using formic acid, the pH of the reaction mixture was adjusted to about 5 and maintained at 90° C. during 15 minutes. Using trisodium phosphate, the pH was adjusted to about 8, and 83 grams of acetone (1.6 moles) were added. The mixture was maintained at 50° C. during 20 minutes. Then it was heated to 80° C. within 15 minutes and cooled. 1817 grams of aqueous condensate (b) were formed.

All (a) and (b) formed and 50 grams of ethylene glycol (0.8 mole) were mixed with sufficient formic acid to bring the pH of the mixture to about 5. Then the mixture was rapidly heated to 90° C. and maintained at that temperature during 30 minutes. It was subsequently cooled, the pH was adjusted to 7.5 using a 10 percent aqueous sodium hydroxide solution, and in vacuo the solids content of the mixture was evaporated to 73 percent. There were mixed 2.35 parts by weight of this 73 wt. percent aqueous resin solution with 100 parts by weight of quartz sand, 0.4 part by weight of ammonia chloride, and 1 part by weight of ferric oxide. The mixture obtained was plastic, molded well and could be stored for at least 6 hours at 17 to 20° C. Using the "hot-box process," prismatic solid cores having a square section of the dimension 22.4 millimeters x 22.4 millimeters were formed. To that end, the mixture was shot with a shooting machine into steel core boxed whose temperature was maintained at about 140° C. Depending on the residence time in the core box, the solid cores had the following flexural strength values:

10 sec. 70–75 kp./cm.$^2$
20 sec. 80–85 kp./cm.$^2$
30 sec. 80–85 kp./cm.$^2$
60 sec. 80–85 kp./cm.$^2$ As can be seen 20 seconds were sufficient to attain maximum strength. This relatively short time is short enough for the hot-box process. The maximum strength attained also meets the requirements for hot-box cores.

We claim:

1. A thermosetting condensation product bonding agent suitable for the "hot-box process" prepared by co-condensation of phenol, urea, acetone, formaldehyde, and alkanediol of from 2 to 4 carbons wherein phenol is first condensed under alkaline conditions with formaldehyde to form a first condensation product, said first condensation product is second condensed in an alkaline medium with urea, acetone, and formaldehyde to form a second condensation product, said second condensation product is third condensed under acidic conditions to form a third condensation product, said third condensation product is fourth condensed under acidic conditions with alkanediol of from 2 to 4 carbons to form a fourth condensation product, said fourth condensation product is neutralized to form said bonding agent, said bonding agent prepared utilizing a component ratio of between about 0.5 to 1.5 mole of urea, 0.1 to 1.0 mole of acetone, 2 to 7 moles of formaldehyde and 0.1 to 0.8 mole of alkanediol per mole phenol, between about 20 and 80 wt. percent of the total formaldehyde being used in the first condensing, the first and second condensing being for a total period of between about 0.5 and 2 hours, the third condensing being for a period of between about 0.2 and 1 hour and the fourth condensing being for a period of between about 0.2 and 1 hour.

2. A thermosetting condensation product bonding agent of claim 1 wherein phenol is condensed under alkaline conditions with formaldehyde to form condensation product "a" wherein urea, acetone and formaldehyde are condensed first under alkaline and then under acid conditions to form condensation product "b," subsequently both condensation products "a" and "b" are co-condensed under acid conditions with said alkanediol and the finally obtained condensation product is neutralized.

3. A bonding agent in accordance with claim 1 wherein the condensations are conducted at a temperature between about 50 and 150° C. in the presence of water, said alkaline conditions being of a pH of between about 8.0 and 11 and said acidic conditions being a pH between about 1 and 5.5 and said alkanediol is ethylene glycol.

4. A bonding agent in accordance with claim 2 wherein said condensations are conducted at a temperature between about 50 and 150° C. in the presence of water, said alkaline conditions being of a pH of between about 8.0 and 11 and said acidic conditions being a pH between about 1 and 5.5, and said alkanediol is ethylene glycol.

5. A process of preparing a thermosetting condensation product bonding agent suitable for the "hot-box process" comprising first condensing under alkaline conditions a mixture of formaldehyde and phenol to form a phenol-formaldehyde first condensation product, second condensing said first condensation product under alkaline conditions with urea, acetone and additional formaldehyde to form a second condensation product of phenol, formaldehyde, urea and acetone, and further third condensing said second condensation product under acidic conditions to form a third condensation product and fourth condensing said third condensation product under acidic conditions with alkanediol of from 2 to 4 carbons and neutralizing the resultant product to form said bonding agent, said condensings conducted utilizing a mole ratio of 0.5 to 1.5 moles of urea, 0.1 to 1 mole acetone, 2 to 7 moles of formaldehyde and 0.1 to 0.8 mole of alkanediol per mole of phenol and between about 20 and 80 wt. percent of the total formaldehyde employed in said first condensing, the first and second condensing being for a total period of between about 0.5 and 2 hours, said third condensing being for a period of between about 0.2 and 1 hour and said fourth condensing being for between about 0.2 and 1 hour.

6. A process in accordance with claim 5 wherein said condensings are conducted at a temperature between about 50 and 150° C. in the presence of water, said alkaline conditions being a pH of between about 8.0 and 11 and said acidic conditions being a pH between about 1 and 5.5, and said alkanediol being ethylene glycol.

7. A method in accordance with claim 6 wherein the alkaline pH being maintained utilizing aqueous sodium hydroxide and trisodium phosphate and the acidic pH maintained utilizing formic acid and said neutralization is conducted utilizing aqueous sodium hydroxide.

8. A process of preparing a thermosetting condensation product bonding agent suitable for the "hot-box process" comprising:
   (a) first condensing under alkaline conditions phenol and formaldehyde to form condensate A,
   (b) second condensing first under alkaline conditions then third condensing under acid conditions, urea, acetone, and formaldehyde to form condensate B,
   (c) fourth condensing condensate A and condensate B with an alkanediol under acidic conditions and neutralizing the resultant reaction mass to form said bonding agent, the weight ratio of condensate A to condensate B to alkanediol being between about 1:0.7:0.01 and 1:2:0.08, the mole ratio of phenol to formaldehyde being between about 1:1.5 to 1:2 in said "(a)" condensing the mole ratio of urea+acetone to formaldehyde about 1:2 and urea to acetone between about 1:0.1 and 1:0.5 in said "(b)" condensing and utilizing between about 20 and 80 wt. percent of the total formaldehyde in said first condensing, said first and second condensing being conducted for a period of between about 0.5 and 2 hours, said third condensing conducted for a period of between about 0.2 and 1 hour and said fourth condensing conducted for a period of between about 0.2 and 1 hour.

9. A process in accordance wtih claim 8 wherein said condensings are conducted at a temperature between about 50 and 150° C. in the presence of water, said alkaline conditions being a pH of between about 8.0 and 11 and said acidic conditions being a pH between about 1 and 5.5, and said alkanediol being ethylene glycol.

10. A method in accordance with claim 8 wherein the alkaline pH being maintained utilizing aqueous sodium hydroxide and trisodium phosphate and the acidic pH being maintained utilizing formic acid and said neutralization is conducted utilizing aqueous sodium hydroxide.

11. A molding composition comprising between about 2 and 3 wt. percent of an aqueous solution of the bonding agent in accordance with claim 1, 0.3 to 1 weight percent of an acidic catalyst and the remainder sand.

12. A molding composition in accordance with claim 11 wherein said acidic catalyst is a member selected from the group consisting of ammonium chloride and ammonium nitrate.

References Cited

UNITED STATES PATENTS

| | | | |
|---|---|---|---|
| 2,205,427 | 6/1940 | Loos | 260—840 |
| 2,121,844 | 6/1938 | Weisenburg | 260—840 |
| 3,306,864 | 2/1967 | Lang | 260—38 |
| 3,404,198 | 10/1968 | Guyer | 260—840 |
| 3,539,484 | 11/1970 | Bowman et al. | 260—29.3 |

JOHN C. BLEUTGE, Primary Examiner

U.S. Cl. X.R.

260—38, 50, 828, 840

PO-1050
(5/69)

UNITED STATES PATENT OFFICE
CERTIFICATE OF CORRECTION

Patent No. 3,692,721  Dated September 19, 1972

Inventor(s) Friedrich Josten, Wilhelm Lucker, Hans Albrecht Meyer-Stoll, Wolfgang Von Minden It is certified that error appears in the above-identified patent and that said Letters Patent are hereby corrected as shown below:

Column 1, line 8, after "many" insert --, assignors to Deutsche Texaco Aktiengesellschaft, Hamburg, Germany--.

Signed and sealed this 6th day of March 1973.

(SEAL)
Attest:

EDWARD M. FLETCHER, JR.　　　　　ROBERT GOTTSCHALK
Attesting Officer　　　　　　　　Commissioner of Patents